(12) United States Patent
Ishida et al.

(10) Patent No.: US 8,874,303 B2
(45) Date of Patent: Oct. 28, 2014

(54) FUEL-SAVING DRIVING EVALUATION SYSTEM

(75) Inventors: Takahiro Ishida, Kawaguchi (JP); Yoshitaka Nishiyama, Okegawa (JP)

(73) Assignee: UD Trucks Corporation, Saitama (JP)

( * ) Notice: Subject to any disclaimer, the term of this patent is extended or adjusted under 35 U.S.C. 154(b) by 498 days.

(21) Appl. No.: 13/141,515

(22) PCT Filed: Dec. 14, 2009

(86) PCT No.: PCT/JP2009/070807
§ 371 (c)(1),
(2), (4) Date: Jun. 22, 2011

(87) PCT Pub. No.: WO2010/073925
PCT Pub. Date: Jul. 1, 2010

(65) Prior Publication Data
US 2011/0257832 A1    Oct. 20, 2011

(30) Foreign Application Priority Data

Dec. 22, 2008  (JP) ................................. 2008-325332

(51) Int. Cl.
| | | |
|---|---|---|
| *G01M 15/00* | (2006.01) | |
| *G01F 9/00* | (2006.01) | |
| *B60T 8/32* | (2006.01) | |
| *G06F 19/00* | (2011.01) | |
| *B60W 50/14* | (2012.01) | |
| *B60R 16/023* | (2006.01) | |

(52) U.S. Cl.
CPC ..... *B60R 16/0236* (2013.01); *B60K 2350/1092* (2013.01); *F02D 2200/0614* (2013.01); *B60W 50/14* (2013.01); *F02D 2200/501* (2013.01); *F02D 2200/606* (2013.01)
USPC ......... 701/29.1; 701/93; 701/102; 73/114.38; 73/114.53

(58) Field of Classification Search
USPC ............ 701/29.1, 93, 102; 73/114.38–114.53
See application file for complete search history.

(56) References Cited

U.S. PATENT DOCUMENTS

| | | | | |
|---|---|---|---|---|
| 6,928,361 | B2 * | 8/2005 | Nakayama et al. ........... | 701/104 |
| 7,107,142 | B2 * | 9/2006 | Harada et al. ................ | 701/114 |
| 2004/0098190 | A1 | 5/2004 | Nakayama et al. | |

(Continued)

FOREIGN PATENT DOCUMENTS

| | | |
|---|---|---|
| JP | 05-189698 A | 7/1993 |
| JP | 09-287656 A | 11/1997 |

(Continued)

OTHER PUBLICATIONS

International Search Report for PCT/JP2009/070807, Jan. 8, 2010.

*Primary Examiner* — James Trammell
*Assistant Examiner* — Majdi Alsomiri
(74) *Attorney, Agent, or Firm* — Smith Patent Office

(57) ABSTRACT

Disclosed is a fuel-saving driving evaluation system which provides a driver with advice suitable for the driver based on fuel-saving driving evaluation standards which correspond to the fuel-saving driving proficiency level of the driver, so that the driver is relaxed and the fuel-saving driving skill of the driver is gradually improved. The fuel-saving driving evaluation system is comprised of an engine speed measuring device, a vehicle speed measuring device, a fuel flow measuring device, and a control device. The control device has a function to store several kinds of standard values and target values of parameters (driving operation parameters) for evaluating the fuel-saving driving level in the vehicle to be evaluated, and a function to determine the standard values and the target values of the parameters based on control signals sent from outside of the control device.

8 Claims, 5 Drawing Sheets

(56) References Cited

U.S. PATENT DOCUMENTS

2007/0255477 A1* 11/2007 Okuda et al. .................... 701/93
2007/0262855 A1* 11/2007 Zuta et al. ..................... 340/439
2008/0033624 A1* 2/2008 Gronau et al. ................. 701/93

FOREIGN PATENT DOCUMENTS

| | | | |
|---|---|---|---|
| JP | 2002-138889 | A | 5/2002 |
| JP | 2003-278573 | A | 10/2003 |
| JP | 2005-201190 | A | 7/2005 |

\* cited by examiner (1) START AND ACCELERATOR ACCELERATOR POSITION (%)
(2) SHIFT-UP ENGINE SPEED (rpm)
(3) STEADY-DRIVING ENGINE SPEED (rpm)
(4) DECELERATION COASTING RATE (%)
(5) MAXIMUM VEHICLE SPEED (km/h) 2/km
(6) TRAVELING VEHICLE SPEED (EXPRESSWAY) (km/h)
(7) WASTED BRAKE FUEL RATE (EXPRESSWAY) (%)
(8) VEHICLE-SPEED FLUCTUATION (EXPRESSWAY) (km/h)

FUEL-SAVING DRIVING EVALUATION SYSTEM

TECHNICAL FIELD

The present invention relates to a fuel-saving driving evaluation technology that evaluates driving fuel efficiency and gives advice relating to various driving manipulations to a driver.

BACKGROUND ART

For the evaluation technologies relating to fuel-saving driving, various evaluation methods and evaluation systems have been proposed in recent years.

For example, a technology in which a specific parameter is set and fuel-saving driving evaluation is made for a driver and/or a driving administrator and on the basis of the evaluation results, an instruction relating to fuel-saving driving is given to a driver is proposed, which contributes to spread of the fuel-saving driving (See Patent Document 1, for example).

However, in the above prior art (Patent Document 1), the evaluation and the advice to the driver are made on the basis of a single evaluation standard without considering the level of fuel-saving driving skills of the driver.

If the driving evaluation is made on the basis of the single evaluation standard value, achievement of a target is relatively easy for skilled drivers (or so-called "professional"), for example, which might become rather difficult to raise motivation to enforce fuel-saving driving.

On the other hand, for a driver who does not have sufficient experience in fuel-saving driving or a so-called "beginner" (or "amateur"), the driving evaluation standard might be too strict or in a so-called "too high a hurdle" state, and the driver might feel stressed due to the driving evaluation system or give up the effort for enforcing the fuel-saving driving. And there is a fear that the motivation to enforce the fuel-saving driving is lowered.

Patent Document 1: JPA (Non-examined publication) No. 2005-201190

SUMMARY OF INVENTION

Problem to be Solved

The present invention was made in view of the above problems of the prior arts and has an object to provide a fuel-saving driving evaluation system that solves stress of a driver and improves fuel-saving driving skills of the driver in steps by giving advice suitable for the driver in accordance with an evaluation standard of the fuel-saving driving corresponding to the fuel-saving driving skill of the driver.

Solution Means for Problems

A fuel-saving driving evaluation system (100) of the present invention is characterized by comprising an engine speed (an engine rotation number) measuring device (engine speed sensor (engine rotation sensor) 1: including a case of reading an engine speed from information from a control unit) which measures the engine speed of a vehicle (10) to be evaluated, a vehicle speed measuring device (vehicle speed sensor 2: including a case of reading a vehicle speed from the information from the control unit) which measures a vehicle speed (car speed) of the vehicle (10) to be evaluated, a fuel flow-rate measuring device (fuel flow meter 3: including a case of reading a fuel flow rate from information from the control unit) which measures a fuel flow rate, and a controller (9), the controller (9) has a function of storing a plurality of types of standard values and target values of parameters (driving manipulation parameters) relating to fuel-saving driving evaluation of the vehicle (10) to be evaluated, a function of determining the standard values and the target values of said parameters on the basis of a control signal (a selection signal by which a skilled driver mode or a beginner mode is selected) sent from the outside of the controller (9), and a function of comparing the determined standard values and the target values with the measurement results of the measuring device and of evaluating whether or not the fuel-saving driving is achieved (claim 1).

Also, in the present invention, the controller (9) preferably has a function of storing the standard values and the target values to become the basis of said parameters (such as the standard values and the target values used in the skilled driver mode, for example) and a function of separately setting the standard values and the target values of the parameters by using the standard values and the target values to become the basis (the standard values and the target values used in the beginner mode are set, for example) (claim 2).

Here, the standard values and the target values of said parameters separately set may be only one type or may be a plurality of types.

Here, in a case that said parameter is a parameter (an accelerator position at start acceleration, an engine speed at shift-up, an engine, speed in steady driving, a maximum vehicle speed, a driving vehicle speed on expressway, a rate of wasted brake fuel on expressway, and a vehicle speed fluctuation on expressway, for example) other than a rate of driving by inertia during deceleration (a rate of deceleration coasting), the following equation is formed between the standard values and the target values of said separately set parameters and the standard values and the target values of the parameters to be the basis:

separately set standard value=standard value to be the basis+(standard value to be the basis−target value to be the basis)×(100−$E$)/(100−50)

separately set target value=target value to be the basis+(standard value to be the basis−target value to be the basis)×(100−$E$)/(100−50) and $E$ (difficulty level to the target value and standard value of the parameter to be the basis: $E$=approximately 80 to 90, for example) is preferably a constant set by the difficulty level (claim 3).

Here, the "standard value" is a numerical value of a parameter relating to the fuel-saving driving evaluation and the numerical value corresponding to "50%" in the driving evaluation.

Also, the "target value" is a numerical value of a parameter relating to the fuel-saving driving evaluation and the numerical value corresponding to "100%" in the driving evaluation.

Also, in a case that said parameter is a rate of driving by inertia during deceleration (a rate of deceleration coasting), the following equation is formed between the standard values and the target values of said separately set parameters and the standard values and the target values of the parameters to be the basis:

separately set standard value=standard value to be the basis−(target value to be the basis−standard value to be the basis)×(100−$E$)/(100−50)

separately set target value=target value to be the basis−(target value to be the basis−standard value to be the basis)×(100−$E$)/(100−50) and E (difficulty level to the target value and standard value of the parameter to be the basis) is preferably a constant set by the difficulty level (claim 4).

Here, if only one type of the standard value and the target value of said separately set parameter is to be set, only one type of the value of E is set (E=approximately 80 to 90, for example), while if a plurality of types of the standard value and the target value of said separately set parameter are to be set, the constant E is preferably set in plural (in the same number as the types of the standard value and the target value of the separately set parameter) (claim 5).

In the present invention, it is preferably so constructed that a first controller (on-vehicle unit 9) mounted on the vehicle (10) to be evaluated and a second controller (server 21 that analyzes and processes data) provided outside the vehicle (10) to be evaluated are provided, and various types of information (an engine speed of the vehicle to be evaluated, a vehicle speed of the vehicle to be evaluated, a fuel flow rate and the like) in the vehicle (10) to be evaluated stored in the first controller (9) are transmitted to the second controller (21) via communication (40) or a storage medium.

Here, the first controller (9) preferably has the function of storing a plurality of types of the standard values and the target values of the parameters relating to the fuel-saving driving evaluation of the vehicle (10) to be evaluated, the function of determining the standard values and the target values of said parameters on the basis of the control signal (selection signal for selecting between the skilled driver mode and the beginner mode) sent from outside the controller (9), and the function of comparing the determined standard values and target values with the measurement result of the measuring device and evaluating whether or not the fuel-saving driving is achieved.

However, the above-mentioned functions may be performed by the second controller (21).

Alternatively, only either one of the first controller (9) and the second controller (21) may be provided.

Advantageous Effects of the Invention

According to the present invention being provided with the above-mentioned constructions, since a plurality of types of the standard values and the target values of the parameters relating to the fuel-saving driving evaluation of the vehicle (10) to be evaluated are provided, a plurality of evaluation modes, that is, a mode in which a strict evaluation result is outputted, a mode in which the evaluation is not so strict and the like, are provided for the fuel-saving driving evaluation.

Thus, the standard values and target values of said parameters can be selected or set so that the mode in which a strict evaluation result is outputted (skilled driver mode) is applied to a driver skilled in the fuel-saving driving, while the standard values and the target values of said parameters can be selected or set so that the mode in which the evaluation is not so strict is applied to a driver not used to the fuel-saving driving (such as a beginner, for example).

As a result, a situation that the driver not used to the fuel-saving driving feels stressed by being determined as poor in the evaluation result or motivation to continue the fuel-saving driving is lowered can be avoided.

Also, the present invention can be applied as a tool for education to prompt the driver not used in the fuel-saving driving to perform the fuel-saving driving in steps.

In the present invention, if the standard values and the target values of said parameters are set on the basis of the above-mentioned equations, for example (claims 3 to 5), by setting the numerical value of the constant E as appropriate, fine fuel-saving driving education can be given in accordance with the level of the driver.

Also, since an index of "achievement of a higher level" that can be understood extremely easily can be indicated to drivers, it can be used as motivation for the drivers to improve their skills of fuel-saving driving.

In addition, according to the present invention, since the above-mentioned working effects can be obtained by extremely simple processing of changing the standard values and the target values of the parameters, an introduction cost when the present invention is to be applied to an existing vehicle and the like can be kept extremely low (inexpensive).

DESCRIPTION OF EMBODIMENTS

An embodiment of the present invention will be described below in reference with the attached drawings.

Figure 1:
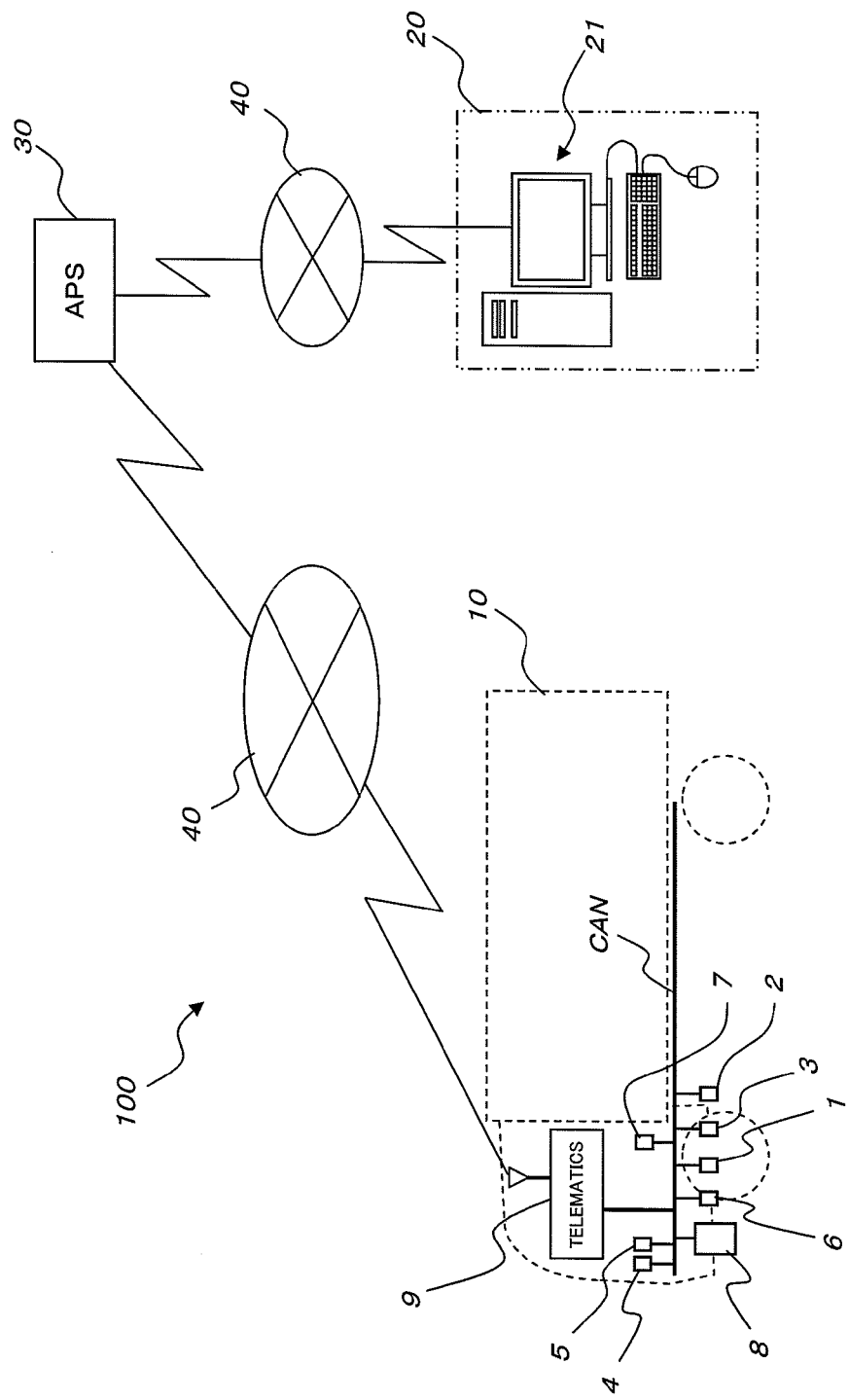
FIG. 1 is a block diagram of an embodiment of the present invention.

In FIG. 1, a fuel-saving driving evaluation system indicated as a whole by reference numeral 100 has a vehicle 10 to be evaluated, a driving control side 20, a communication carrier 30, and a communication line 40.

In FIG. 1, it is constructed that data is sent/received between the vehicle 10 to be evaluated and the driving control side 20 via the communication carrier 30 and the communication line 40, but it is possible to directly connect the vehicle 10 to be evaluated and the driving control side 20 via a communication line without using the communication carrier 30.

The vehicle 10 to be evaluated is provided with an engine speed sensor 1, a vehicle speed sensor 2, a fuel meter 3, an accelerator position sensor 4 (an accelerator opening degree sensor 4), an engine controller 8, an in-vehicle communication line CAN, and a first controller (hereinafter referred to as an "in-vehicle unit") 9.

Various types of information from the engine speed sensor 1, the vehicle speed sensor 3, the fuel meter 3, the accelerator position sensor 4, and the engine controller 8 are constructed to be transmitted to the in-vehicle unit 9 via the in-vehicle communication line CAN.

On the driving control side 20, a second controller (hereinafter referred to as a "server") is provided.

Figure 2:
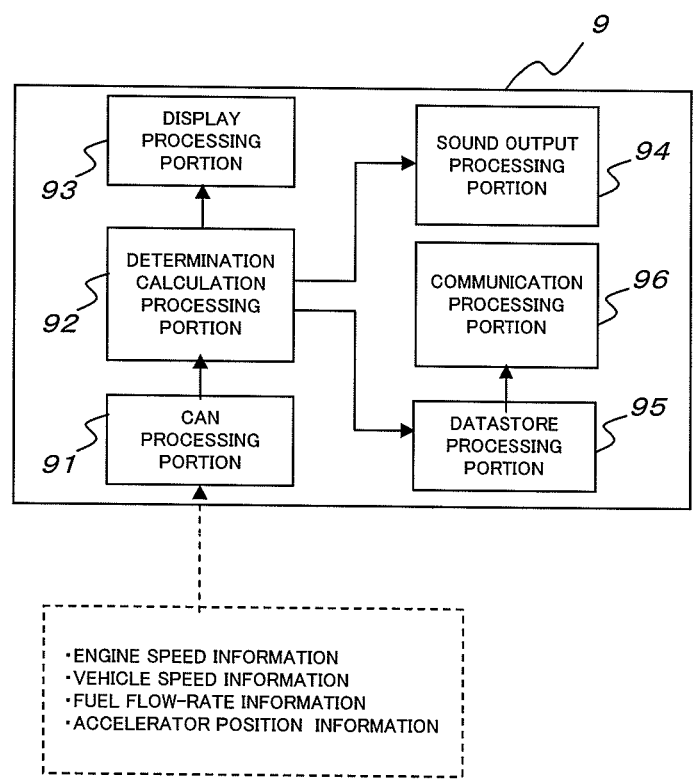
FIG. 2 is a block diagram of an in-vehicle unit in the embodiment.

FIG. 2 illustrates a construction of the in-vehicle unit 9.

In FIG. 2, the in-vehicle unit 9 is provided with a CAN processing portion 91, a determination calculation processing portion 92, a display processing portion 93, a sound output processing portion 94, a data store processing portion 95, and a communication processing portion 96.

Into the CAN processing portion 91, engine speed information, accelerator position information (accelerator opening degree information), vehicle speed information, and fuel flow-rate information are inputted from the various sensors 1 to 7 and the engine control 8 via the in-vehicle communication line CAN. The various types of information inputted into the CAN processing portion 91 are sorted and transmitted to the determination calculation processing portion 92.

The determination calculation processing portion 92 has a function of calculating the standard values and the target values of the parameters (driving manipulation parameters) relating to the fuel-saving driving evaluation of the vehicle, which will be described later in FIG. 4 and a function of storing a plurality of types of the calculated standard values and target values from various types of information transmitted from the CAN processing portion 91. Moreover, the portion has a function of determining the standard values and the target values of said parameters on the basis of the control signal transmitted from a server 21 of the driving control side 20, for example.

Here, the control signal sent from the server 21 is a selection signal for selecting the skilled mode (for professional) or the beginner mode (for amateur), for example, and is information relating to the constant "E", which will be described later.

The display processing portion 93 is constructed to execute processing of displaying the standard values and the target values of the driving manipulation parameters calculated by the determination calculation processing portion 92 on a monitor screen, not shown, mounted on the vehicle.

Here, the "standard value" is a numerical value of the parameter relating to the fuel-saving driving evaluation and the numerical value corresponding to the "50%" (or 50 points out of 100 points) in the driving evaluation.

Also, the "target value" is a numerical value of the parameter relating to the fuel-saving driving evaluation and the numerical value corresponding to "100%" (or 100 points out of 100 points) in the driving evaluation.

The sound output processing portion 94 has a function of giving advice to be given to the driver regarding the fuel-saving driving using a sound generating device, not shown, equipped on the vehicle on the basis of the standard value and the target value of the driving manipulation parameters calculated by the determination calculation processing portion 92.

The data store processing portion 95 has a function of temporarily storing and processing the standard values and the target values of the various driving manipulation parameters calculated by the determination calculation processing portion 92 so that the values can be transmitted easily.

The communication processing portion 96 has a function of transmitting the data processed by the data store processing portion 95, that is, the standard values and the target values of the various driving manipulation parameters to the server 21 of the driving control side 20 using the communication circuit 40 via the communication processing portion 96.

The determination calculation processing portion 92 has a function of comparing the determined standard values and target values with the measurement results of the various parameters when the driver to be evaluated was driving and of evaluating whether or not the fuel-saving driving has been achieved.

In the case of commercial vehicles or particularly cargo vehicles, the vehicle weight is varied depending on the load and the parameters of the driving manipulation are also changed with the change in the vehicle weight. Though not clearly illustrated, the determination calculation processing portion 92 is capable of having a function of making evaluation in accordance with such change in the vehicle weight.

Figures 3, 4:
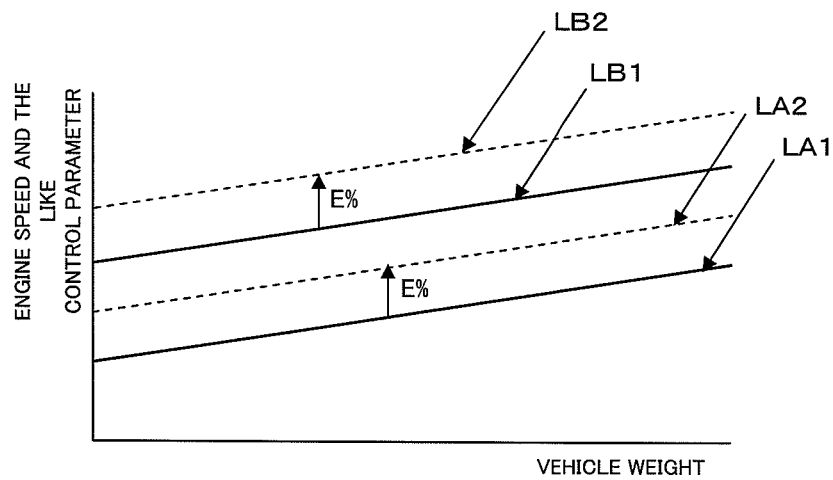
FIG. 3 is a characteristic diagram illustrating evaluation characteristics of driving manipulation parameters in the embodiment.
FIG. 4 is a diagram illustrating the driving manipulation parameters in the embodiment by using a table.

FIG. 3 is a characteristic diagram relating to the parameters, in which the vertical axis indicates the parameters of the driving manipulation (engine speed, for example) and the horizontal axis indicates the vehicle weight.

In FIG. 3, a characteristic line (LA1: difficult/for skilled driver) of a target driving manipulation reference value to be the basis, a characteristic line (LA2: easy/for beginner) of a target driving evaluation reference value set separately, a characteristic line (LB1: difficult/for skilled driver) of a standard driving manipulation reference value to be the basis, and a characteristic line (LB2: easy/for beginner) of a standard driving evaluation reference value set separately are shown at the same time.

Here, in FIG. 3, two types of the characteristic line (LA1: difficult/for skilled driver) and the characteristic line (LA2: easy/for beginner) set separately (two types of characteristics lines of the target value and the standard value for each: four characteristic lines in total) are shown, but as will be described later, the number of types can be increased to three or more.

As the parameters of the fuel-saving driving evaluation (parameters relating to vehicle manipulation), the following eight parameters can be named as shown in FIG. 4, for example:

(1) Start and acceleration accelerator position (%)
(2) Shift-up engine speed (rpm)
(3) Steady-driving engine speed (rpm)
(4) Deceleration coasting rate (%)
(5) Maximum vehicle speed $(km/h)^2/km$
(6) Traveling vehicle speed (expressway) (km/h)
(7) Wasted brake fuel rate (express way) (%)
(8) Vehicle speed fluctuation (expressway) (km/h)

In FIG. 3, the parameters of all the above parameters except the "deceleration coasting rate (%)" in the item (4), that is, the parameters in the items (1) to (3) and (5) to (8) are shown.

Here, in a case that the parameters are those parameters other than the item (4) "deceleration coasting rate" in FIG. 4, that is, (1) Start and acceleration accelerator position, (2) Shift-up engine speed, (3) Steady-driving engine speed, (5) Maximum vehicle speed, (6) Traveling vehicle speed on expressway, (7) Wasted brake fuel rate on express way, and (8) Vehicle speed fluctuation on expressway, between the target values (LA2) and the standard values (LB2) of the parameters set separately and the target values (LA1) and the standard values (LB1) of the parameters to be the basis, the following relationships are formed:

separately set standard value=standard value to be the basis+(standard value to be the basis−target value to be the basis)×(100−$E$)/(100−50)

and separately set target value=target value to be the basis+(standard value to be the basis−target value to be the basis)×(100−$E$)/(100−50)

That is, the following equations are formed:

$$LB2 = LB1 + (LB1 - LA1) \times (100 - E)/(100 - 50)$$

and $$LA2 = LA1 + (LB1 - LA1) \times (100 - E)/(100 - 50)$$

The relationships are shown in FIG. 3.

In the above equations, the term "E" is a constant set by a difficulty level (E=approximately 80 to 90, for example).

Also, in a case that said parameter is the "deceleration coasting rate" in the item (4) in FIG. 4, between the standard values (LA2) and the target values (LB2) of said parameters set separately and the standard values (LA1) and the target values (LB1) of the parameters to be the basis, the following relationships are formed:

Separately set standard value=standard value to be the basis−(target value to be the basis−standard value to be the basis)×(100−$E$)/(100−50)

and

Separately set target value=target value to be the basis−(target value to be the basis−standard value to be the basis)×(100−$E$)/(100−50)

Figure 7:
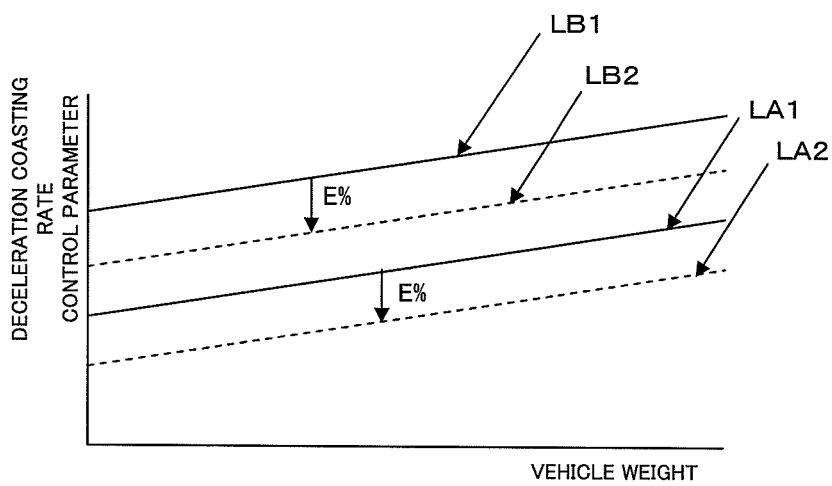
FIG. 7 is a characteristic diagram illustrating evaluation characteristics of a deceleration coasting rate control parameter in the embodiment.

That is, the following equations are formed:

$LA2 = LA1 − (LB1 − LA1) × (100−E)/(100−50)$ and $LB2 = LB1 − (LB1 − LA1) × (100−E)/(100−50)$ The relationships are shown in FIG. 7.

In the above equations, too, the term "E" is a constant set by a difficulty level (E=approximately 80 to 90, for example).

Here, if only one type of the standard value and the target value of said parameter set separately is to be set, only one type of the E value is set (E=approximately 80 to 90, for example).

On the other hand, if a plurality of types of the standard values and the target values of said parameters set separately are to be set, it is possible to set a plurality of (the same number as the number of the types of the standard values and the target values of said parameters set separately) the constant E.

On the basis of the flowchart in FIG. 5 and also by referring to FIGS. 1 to 4, control of the fuel-saving driving evaluation according to the embodiment will be described.

Figure 5:
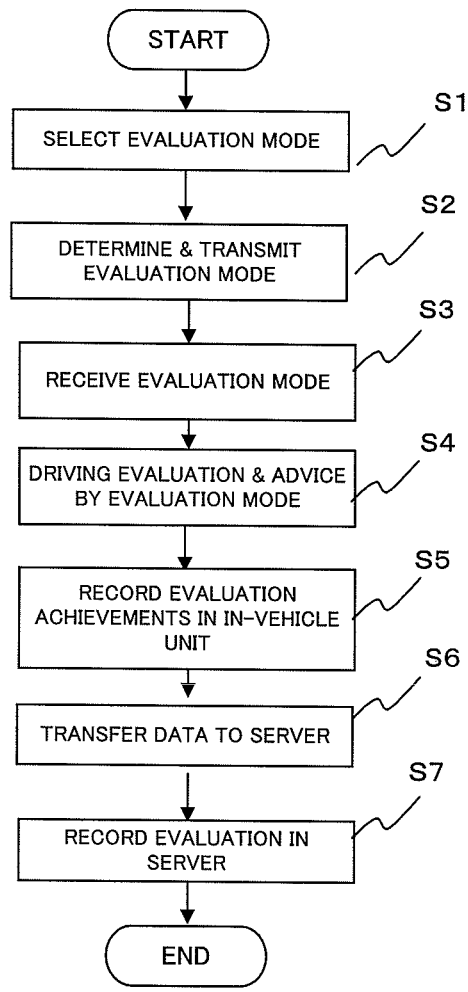
FIG. 5 is a control flowchart of a fuel-saving driving evaluation method in the embodiment.

At Step S1 in FIG. 5, the server 21 of the driving control side 20, for example, selects the evaluation mode or the constant "E" for each driver and transmits the evaluation mode or the constant "E" selected for each driver to the vehicle 10 to be evaluated via the communication carrier 30 or the commercial communication line 40 or any other communication means (Step S2).

Here, though not shown, to the in-vehicle unit 9 of the vehicle 10 to be evaluated, the evaluation mode of the driver to be evaluated or the constant "E" can be directly inputted.

At Step S3, the in-vehicle unit 9 of the vehicle 10 side receives the evaluation mode and proceeds to Step S4. Then, the determination calculation processing portion 92 of the in-vehicle unit 9 of the vehicle 10 to be evaluated calculates the "separately set standard value (LB2)" and the "separately set target value (LA2)" in the case of the "deceleration coasting rate (%)" in the item (4) in FIG. 4 for the various parameters (1) to (8) shown in FIG. 4 by the selected evaluation mode or the constant "E" by using the above-mentioned relationship or the equation.

In the case of the "deceleration coasting rate (%)" in the item (4) in FIG. 4, the "separately set standard value (LB2)" and the "separately set target value (LA2)" acquired by the calculation are compared with measured values of the various parameters (1) to (8) during driving by the driver to be evaluated, and a degree of achievement of the fuel-saving driving is evaluated by 100 points or percentage, for example.

Then, in accordance with the evaluation, advice relating to the fuel-saving driving is given to the driver as necessary. The advice to the driver is given by display on the monitor, not shown, or by the sound generating device, not shown.

At Step S5, the evaluation result at Step S4 is recorded in the database (not shown in FIGS. 1 and 2). Then, at step S6, the evaluation result is transferred to the server 21 of the driving control side 20 (Step S6).

At Step S7, the server 21 records the evaluation results at Step S4 on the basis of the evaluation mode at a point of time when driving of the vehicle by the driver to be evaluated for the fuel-saving driving is finished.

Figure 6:
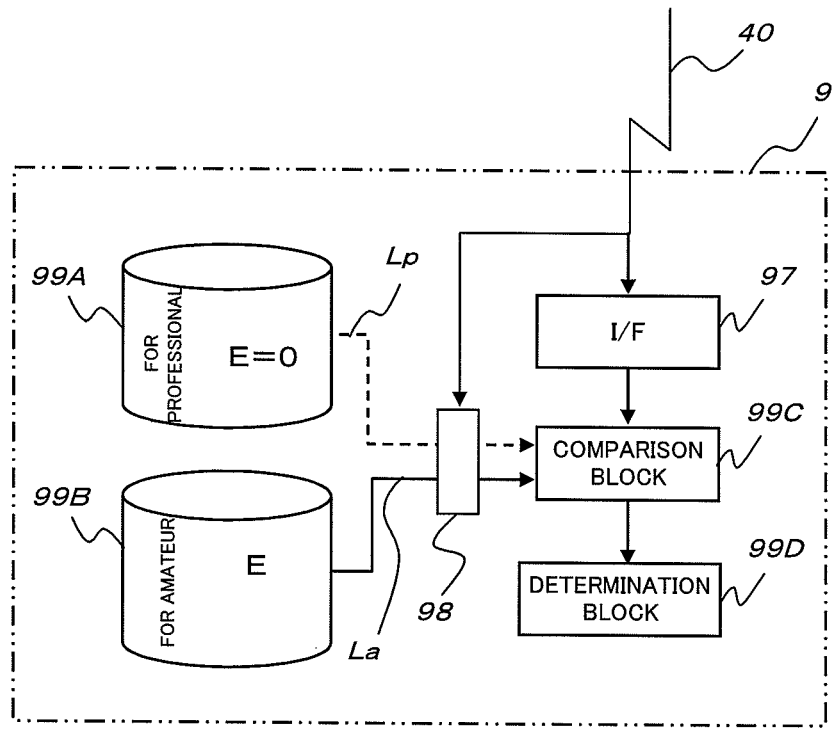
FIG. 6 is a block diagram of a variation of the in-vehicle unit of the embodiment.

At Step S4, in calculating the "separately set target value (LA2)" and the "separately set standard value (LB2)", it is constructed such that the index "E" of the difficulty level is switched by a switching device 98 of the determination calculation processing portion 92 in accordance with the skill of the fuel-saving driving of the driver to be evaluated as shown in FIG. 6.

That is, regarding the in-vehicle unit 9, instead of the construction shown in FIG. 2, it may be so constructed as shown in a variation in FIG. 6 that the interface 97, the switching device 98, an "E" storing portion 99A for a skilled driver, an "E" storing portion 99B for a beginner, a comparison block 99C, and a determination block 99D are provided, and when the evaluation mode of the individual driver is selected from the server 21 at Step S1, the switching device 98 is operated in accordance with the evaluation mode of the individual driver, whereby the "E" corresponding to the driver to be evaluated is selected.

In FIG. 6, the "separately set target value (LA2)" and the "separately set standard value (LB2)" are calculated at Step S4 by using the "E" corresponding to the driver to be evaluated and compared with the actually measured value of the parameter of the fuel-saving driving evaluation of the driver in the comparison block 99C.

The determination block 99D determines a degree of achievement of the fuel-saving driving of the driver on the basis of the comparison result of the comparison block 99C.

According to the illustrated embodiment, since the plurality of types of the standard values and the target values of the driving manipulation parameters relating to the fuel-saving driving evaluation are provided, a plurality of evaluation modes, that is, the mode in which a strict evaluation result is outputted (for a skilled driver), the mode in which the evaluation is not so strict (for a beginner) and the like are provided in the fuel-saving driving evaluation.

The standard values and the target values of the driving manipulation parameters are selected or set so that the mode in which a strict evaluation result is outputted or a so-called skilled driver mode is applied to a driver skilled in the fuel-saving driving, for example. Also, the standard values and the target values of said parameters are selected or set so that the mode in which the evaluation is not so strict is applied to a beginner not used to the fuel-saving driving.

By setting as above, a situation that the driver not used to the fuel-saving driving feels stressed by being determined as poor in the evaluation result or motivation to continue the fuel-saving driving is lowered can be avoided.

On the other hand, for the skilled drivers, too, by making setting with a high difficulty level, motivation to realize the fuel-saving driving at a higher level can be given.

Also, the illustrated embodiment can be applied as a tool for education to prompt the driver not used in the fuel-saving driving to perform the fuel-saving driving in steps.

By setting the numerical value of the constant "E" in the above-mentioned equation as appropriate, for example, the fuel-saving driving evaluation standards in plural stages can be set in accordance with the driver's level, and fine fuel-saving driving education can be conducted.

Also, since a target such as "higher level" that can be grasped extremely easily can be indicated to the drivers, it is possible to motivate the drivers for improvement in the fuel-saving driving skills.

In addition, according to the illustrated embodiment, since the working effect as described above can be obtained through extremely simple processing such as change of the standard values and the target values of the above-mentioned parameters (1) to (8) or change of the constant "E", an introduction cost when the present invention is applied to an existing vehicle or the like can be kept extremely low.

The illustrated embodiment is only an example and the description is not intended to limit the technical scope of the present invention.

For example, in the illustrated embodiment, the fuel-saving driving evaluation is made by the in-vehicle unit 9 of the vehicle 10, but it can be executed by the server 21 of the driving control side 20.

REFERENCE SIGNS LIST

1 engine speed sensor
2 vehicle speed sensor
3 fuel meter
4 accelerator position sensor
8 engine controller
9 first controller/in-vehicle unit
10 vehicle to be evaluated
20 driving control side
21 second controller/server
30 communication carrier
40 communication line

The invention claimed is:

1. A fuel-saving driving evaluation system comprising:
   an engine speed measuring device which measures an engine speed of a vehicle to be evaluated;
   a vehicle speed measuring device which measures a vehicle speed of the vehicle to be evaluated;
   a fuel flow-rate measuring device which measures a fuel flow rate; and
   a controller,
   the controller has a function of storing a plurality of types of standard values and target values of parameters relating to fuel-saving driving evaluation of the vehicle to be evaluated;
   a function of determining the standard values and the target values of said parameters on the basis of a control signal sent from a second controller which is constructed to send and receive data to and from the vehicle to be evaluated; and
   a function of comparing the determined standard values and the target values with the measurement results of the measuring device and of determining whether or not the fuel-saving driving is achieved, wherein
   in a case that said parameter is a parameter other than a rate of driving by inertia during deceleration, the following equation is formed between the standard values and the target values of said separately set parameters and the standard values and the target values of the parameters to be the basis:

separately set standard value=standard value to be the basis+(standard value to be the basis−target value to be the basis)×(100−E)/(100−50)

separately set target value=target value to be the basis+(standard value to be the basis−target value to be the basis)×(100−E)/(100−50)

and E is a constant set by a difficulty level.

2. The fuel-saving driving evaluation system according to claim 1, wherein
   in case that only one type of the standard value and the target value of said separately set parameter is to be set, only one type of the value of said E is set, while if a plurality of types of the standard value and the target value of said separately set parameter are to be set, said constant E is set in plural.

3. A fuel-saving driving evaluation system comprising:
   an engine speed measuring device which measures an engine speed of a vehicle to be evaluated;
   a vehicle speed measuring device which measures a vehicle speed of the vehicle to be evaluated;
   a fuel flow-rate measuring device which measures a fuel flow rate; and
   a controller,
   the controller has a function of storing a plurality of types of standard values and target values of parameters relating to fuel-saving driving evaluation of the vehicle to be evaluated;
   a function of determining the standard values and the target values of said parameters on the basis of a control signal sent from a second controller which is constructed to send and receive data to and from the vehicle to be evaluated; and
   a function of comparing the determined standard values and the target values with the measurement results of the measuring device and of determining whether or not the fuel-saving driving is achieved, wherein
   in a case that said parameter is a rate of driving by inertia during deceleration, the following equation is formed between the standard values and the target values of said separately set parameters and the standard values and the target values of the parameters to be the basis:

separately set standard value=standard value to be the basis−(target value to be the basis−standard value to be the basis)×(100−E)/(100−50)

separately set target value=target value to be the basis−(target value to be the basis−standard value to be the basis)×(100−E)/(100−50)

and E is a constant set by the difficulty level.

4. The fuel-saving driving evaluation system according to claim 3, wherein
   in case that only one type of the standard value and the target value of said separately set parameter is to be set, only one type of the value of said E is set, while if a plurality of types of the standard value and the target value of said separately set parameter are to be set, said constant E is set in plural.

5. A fuel-saving driving evaluation system comprising:
   an engine speed measuring device which measures an engine speed of a vehicle to be evaluated;
   a vehicle speed measuring device which measures a vehicle speed of the vehicle to be evaluated;
   a fuel flow-rate measuring device which measures a fuel flow rate; and
   a controller,
   the controller has a function of storing a plurality of types of standard values and target values of parameters relating to fuel-saving driving evaluation of the vehicle to be evaluated;

a function of determining the standard values and the target values of said parameters on the basis of a control signal sent from a second controller which is constructed to send and receive data to and from the vehicle to be evaluated; and a function of comparing the determined standard values and the target values with the measurement results of the measuring device and of determining whether or not the fuel-saving driving is achieved, wherein the controller has a function of storing the standard values and the target values to become the basis of said parameters and a function of separately setting the standard values and the target values of said parameters by using the standard values and the target values to become the basis, wherein in a case that said parameter is a parameter other than a rate of driving by inertia during deceleration, the following equation is formed between the standard values and the target values of said separately set parameters and the standard values and the target values of the parameters to be the basis:

separately set standard value=standard value to be the basis+(standard value to be the basis−target value to be the basis)×(100−$E$)/(100−50)

separately set target value=target value to be the basis+(standard value to be the basis−target value to be the basis)×(100−$E$)/(100−50)

and E is a constant set by a difficulty level.

6. The fuel-saving driving evaluation system according to claim 5, wherein in case that only one type of the standard value and the target value of said separately set parameter is to be set, only one type of the value of said E is set, while if a plurality of types of the standard value and the target value of said separately set parameter are to be set, said constant E is set in plural.

7. A fuel-saving driving evaluation system comprising:

an engine speed measuring device which measures an engine speed of a vehicle to be evaluated;

a vehicle speed measuring device which measures a vehicle speed of the vehicle to be evaluated;

a fuel flow-rate measuring device which measures a fuel flow rate; and a controller, the controller has a function of storing a plurality of types of standard values and target values of parameters relating to fuel-saving driving evaluation of the vehicle to be evaluated;

a function of determining the standard values and the target values of said parameters on the basis of a control signal sent from a second controller which is constructed to send and receive data to and from the vehicle to be evaluated; and a function of comparing the determined standard values and the target values with the measurement results of the measuring device and of determining whether or not the fuel-saving driving is achieved, wherein the controller has a function of storing the standard values and the target values to become the basis of said parameters and a function of separately setting the standard values and the target values of said parameters by using the standard values and the target values to become the basis, wherein in a case that said parameter is a rate of driving by inertia during deceleration, the following equation is formed between the standard values and the target values of said separately set parameters and the standard values and the target values of the parameters to be the basis:

separately set standard value=standard value to be the basis−(target value to be the basis−standard value to be the basis)×(100−$E$)/(100−50)

separately set target value=target value to be the basis−(target value to be the basis−standard value to be the basis)×(100−$E$)/(100−50)

and E is a constant set by the difficulty level.

8. The fuel-saving driving evaluation system according to claim 7, wherein in case that only one type of the standard value and the target value of said separately set parameter is to be set, only one type of the value of said E is set, while if a plurality of types of the standard value, and the target value of said separately set parameter are to be set, said constant E is set in plural.

* * * * *